United States Patent [19]
Kimura

[11] Patent Number: 6,105,420
[45] Date of Patent: Aug. 22, 2000

[54] ELECTRO-RHEOLOGICAL FLUID DAMPER CONTROL SYSTEM

[75] Inventor: Takeshi Kimura, Tokyo, Japan

[73] Assignee: Bridgestone Corporation, Tokyo, Japan

[21] Appl. No.: 08/266,906

[22] Filed: Jun. 27, 1994

[51] Int. Cl.⁷ .......................... B60G 17/00; B60G 11/26; F16F 15/03
[52] U.S. Cl. ...................... 73/54.31; 73/11.07; 73/11.04
[58] Field of Search ................. 73/54.31, 11.04, 73/11.07; 395/905; 280/707, 299; 364/424.05

[56] References Cited

U.S. PATENT DOCUMENTS

| | | | |
|---|---|---|---|
| 5,001,640 | 3/1991 | Matsumoto et al. | 364/426.02 |
| 5,060,157 | 10/1991 | Tado et al. | 364/424.05 |
| 5,101,350 | 3/1992 | Tokoro | 364/424.1 |
| 5,138,554 | 8/1992 | Wada | 364/424.05 |
| 5,159,555 | 10/1992 | Wada | 364/424.05 |
| 5,162,997 | 11/1992 | Takahashi | 364/424.05 |
| 5,186,150 | 2/1993 | Sekine | 123/494 |
| 5,189,621 | 2/1993 | Onari et al. | 364/431.04 |
| 5,259,487 | 11/1993 | Petek | 188/267 |
| 5,263,559 | 11/1993 | Mettner | 188/299 |
| 5,276,621 | 1/1994 | Henry et al. | 364/424.05 |
| 5,289,379 | 2/1994 | Williams | 364/424.05 |
| 5,289,380 | 2/1994 | Kimura | 364/424.05 |
| 5,295,563 | 3/1994 | Bennett | 188/299 |
| 5,295,705 | 3/1994 | Butsuen et al. | 280/707 |
| 5,342,079 | 8/1994 | Buma | 280/707 |

*Primary Examiner*—Hezron Williams
*Assistant Examiner*—J. David Wiggins
*Attorney, Agent, or Firm*—John M. Vasuta; Ray L. Weber

[57] ABSTRACT

An electro-rheological (ER) fluid damper control system employs fuzzy logic to attain real time control in a highly responsive manner. The ER fluid damper is interposed in a vehicle between its sprung mass (vehicle body) and unsprung mass (suspension). Signals corresponding to the velocity of the sprung mass and the relative velocity between the sprung and unsprung masses are generated by pairs of accelerometers and electronic integrators. A fuzzy rule, taking into account weighted values of these input signals, is applied to the signals to determine an output value which, in turn, establishes a control signal for application to the electrodes of the ER fluid damper. As the velocity signals change, the voltage applied to the electrodes also changes, thus adjusting the fluid viscosity and mechanical responsiveness of the ER fluid damper.

11 Claims, 3 Drawing Sheets

ELECTRO-RHEOLOGICAL FLUID DAMPER CONTROL SYSTEM

TECHNICAL FIELD

The present invention relates generally to electro-rheological (ER) fluid dampers and, more particularly, to an apparatus and method for electronically controlling the damping force of the ER damper.

BACKGROUND ART

Electronically controlled ER fluid dampers have been previously known, but have not been used in semi-active vehicle suspension systems to control the ride and handling of the vehicle. ER fluid dampers are well-suited for use in semi-active suspension systems because their fast response times enable them to be rapidly adjusted in response to varying conditions. A common control algorithm for such dampers, known as the "Sky-Hook" model, typically involves a feedback loop that adjusts damping level based on the vertical velocity of the sprung body of the vehicle and the velocity of the damper's piston.

Heretofore the "Sky-Hook" model has been implemented using conventional logic control, including "on/off", continuous, "soft-soft" and "hard-hard". To control the damping force of the ER fluid damper, for example, threshold values would be predetermined for the detected velocities which, if exceeded, would cause the mode of the damper to be changed from "soft" to "hard". Tuning of these conventionally controlled suspension systems to suit a particular application, however, was a time consuming task sometimes taking many weeks if not months to perform. The procedure typically involved several technicians who ride in the vehicle and subjectively evaluate its ride and handling for comfort, safety and performance. Adjustments would be made and the vehicle would again be tested. This process would be repeated until the desired compromise between ride and handling was achieved.

Attempts have been made to apply fuzzy logic theory to the control of adjustable dampers in a vehicle. Unlike conventional logic wherein a condition is met or not met, fuzzy logic takes into account the degree by which the condition is or is not met. Instead of a road condition being smooth or not smooth (rough), a fuzzy variable state may be very smooth, slightly smooth, slightly rough or very rough. Known prior attempts have used fuzzy inference based on the detected running condition of the vehicle and, more particularly, detected steering angle, vehicle speed, vertical acceleration of the vehicle, braking action and throttle opening speed to control damping force. However, none of these known attempts have used the vertical velocity of the sprung body of the vehicle and the relative velocity between the sprung body and unsprung mass as fuzzy variable inputs nor has there been any recognition in the art of benefits afforded thereby such as ease in tuning an ER fluid damper in a vehicle suspension system.

SUMMARY OF THE INVENTION

The present invention provides a novel system and method for controlling the damping force of an ER fluid damper and, more particularly, such a damper used in a vehicle suspension. The system and method optimize system performance while also enabling efficient "tuning" of the ER fluid damper to provide a desired compromise between ride and handling of the vehicle.

More particularly, the invention provides a method for controlling the damping force of an electro-rheological fluid damper interposed between relatively sprung and unsprung masses in a vehicle, comprising the steps of detecting the velocity of the sprung mass and the relative velocity between the sprung and unsprung masses, performing fuzzy inferences using the sprung mass velocity and the relative velocity as inputs for producing fuzzy outputs in accordance with the application of fuzzy function rules and membership functions that define the state of inference of the sprung mass velocity and relative velocity as fuzzy inference input variables, defuzing the fuzzy outputs to provide a damper control signal, and using the damper control signal to control the damping force of the damper. Tuning of the fluid damper may be efficiently and effectively accomplished by changing the membership function of at least one of the fuzzy inputs and outputs, or by changing one or more of the membership rules. As is preferred, the fuzzy inference is performed by a fuzzy inference processor. However, for cost efficiency, a standard CPU may be employed.

The invention also provides a control apparatus for controlling the damping force of an electro-rheological fluid damper interposed between relative sprung and unsprung masses in a vehicle, comprising detector means for detecting the velocity of the sprung mass and the relative velocity between the sprung and unsprung masses, fuzzy inference means for receiving the sprung mass velocity and the relative velocity as inputs and for producing fizzy outputs in accordance with the application of fuzzy function membership rules and membership functions that define the state of inference of the sprung mass velocity and relative velocity as fuzzy inference input variables, and means for defuzzification of the fuzzy outputs to provide a damper control signal for controlling the damping force of the damper.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principals of the invention may be employed.

BEST MODE FOR CARRYING OUT THE INVENTION

Figure 1:
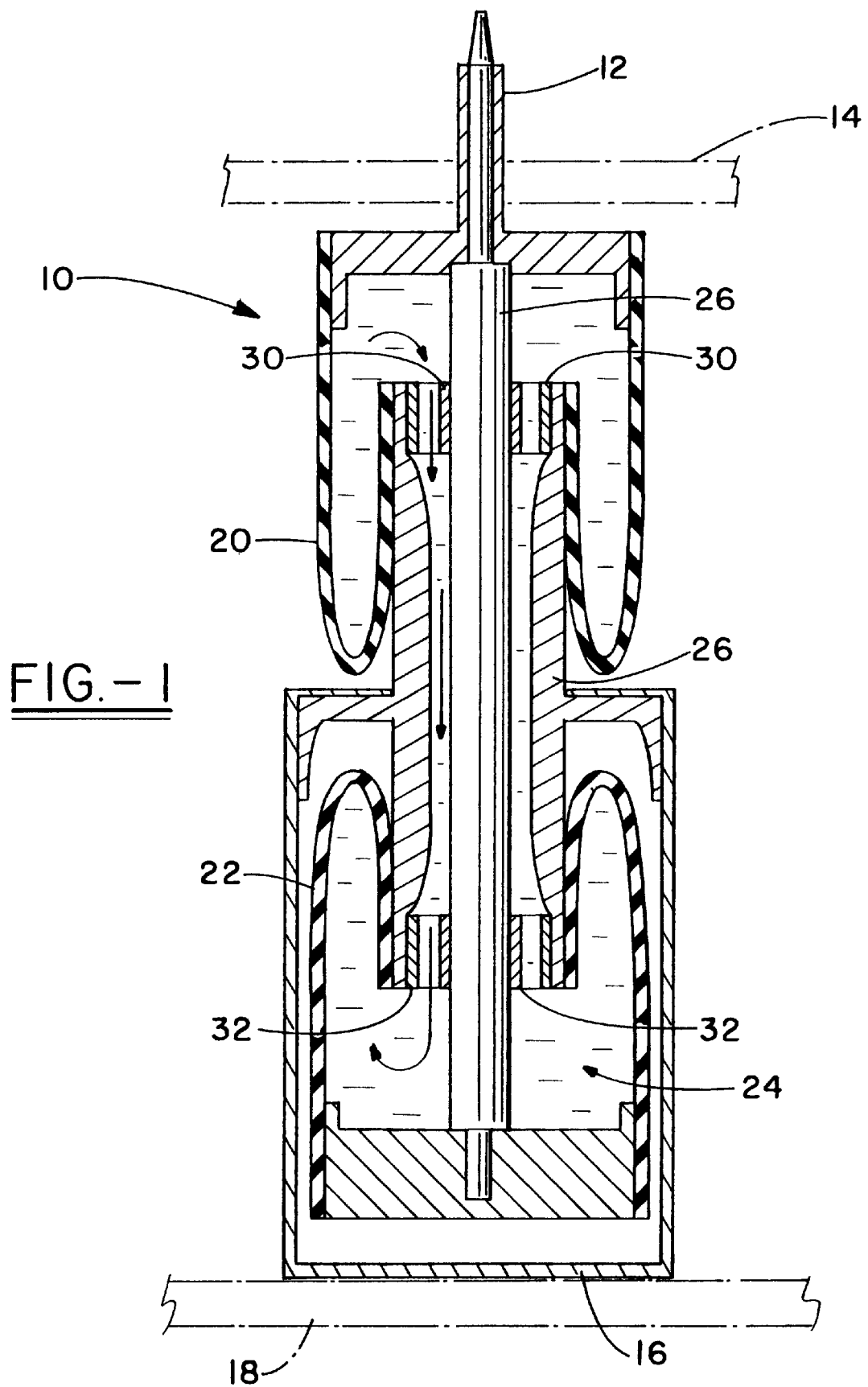
FIG. 1 is a sectional view showing the internal structure of an electro-rheological damper used in the system of the invention.

Referring now to the drawings and more particularly FIG. 1, it can be seen that an electro-rheological (ER) fluid damper is designated generally by the numeral 10. The ER fluid damper 10 is well known in the art and is the type employed in the system of the instant invention to be discussed below. Typically, the ER damper 10 is interposed between a vehicle body and the suspension system of the vehicle to provide shock absorption, vibration damping, and overall stability to the vehicle during operation.

As shown, the fluid damper 10 has an upper portion 12 adapted to be fixedly secured to the vehicle body 14. At the opposite end, a lower portion 16 is secured to the vehicle suspension such as the lower control arm 18 or the like. An expandable and contractible upper rubber sleeve 20 is positioned at the upper portion 12, while a similar lower rubber sleeve 22 is maintained at the lower portion 16. As will be appreciated by those skilled in the art, the sleeves 20, 22 define cavities for retaining an electro-rheological fluid 24.

A central electrode 26 extends between the upper and lower portions 12, 16 and is generally coaxial with the central axle of the fluid damper 10. Typically, the central electrode 26 comprises an electrically conductive rod. A tubular electrode 28 is maintained about and is coaxial with the central electrode 26, as shown. As is well understood by those skilled in the art, upper sliding bearing blocks 30 and lower sliding bearing blocks 32 serve to keep the electrodes 26, 28 in concentric and axially aligned orientation during operation.

As will be understood by those skilled in the art, an electrical field is introduced across the electrodes 26, 28 in the cylindrical path defined therebetween. The viscosity of the ER fluid 24 is controlled by the electric field to which it is exposed. In other words, the electric field across the electrodes 26, 28 establishes the viscosity of the ER fluid 24 passing therebetween. Accordingly, the electrodes 26, 28 act as a damper for fluid passage, the control of the damper being effected by the application of a voltage differential across such electrodes.

In operation, the fluid damper 10 operates in both jounce and rebound modes. The flow of ER fluid 24 in the direction of the arrows shown in FIG. 1 is under conditions of jounce, wherein the fluid passes from the reservoir defined by the upper sleeve 20 through the cylindrical passage between the electrodes 26, 28 and into the reservoir defined by the lower sleeve 22. An opposite direction of flow is experienced during rebound. By controlling the electric field across the electrodes 26, 28, and hence the viscosity of the ER fluid passing therebetween, the responsive characteristics of the ER fluid damper 10 may be instantaneously controlled. In other words, by instantaneously controlling the flow characteristics of the ER fluid 24, the responsive characteristics of the damper 10 can siluilarly be controlled. Additionally, such control can be attained in real time since viscosity changes in the ER fluid 24 are substantially instantaneous with changes in the electric field between the electrodes 26, 28. Consequently, when the fluid damper 10 is to be "hard", the electric field may be induced at one level, while a "soft" damper 10 may be generated by the application of yet another electric field.

It should now be appreciated that by monitoring the velocity of the sprung mass or vehicle body 14 in comparison to the velocity of the piston of the damper 10, data may be derived for effectuating the necessary control of the ER fluid 24 through the electrodes 26, 28 to achieve responsive and adaptive damping action.

Figure 2:
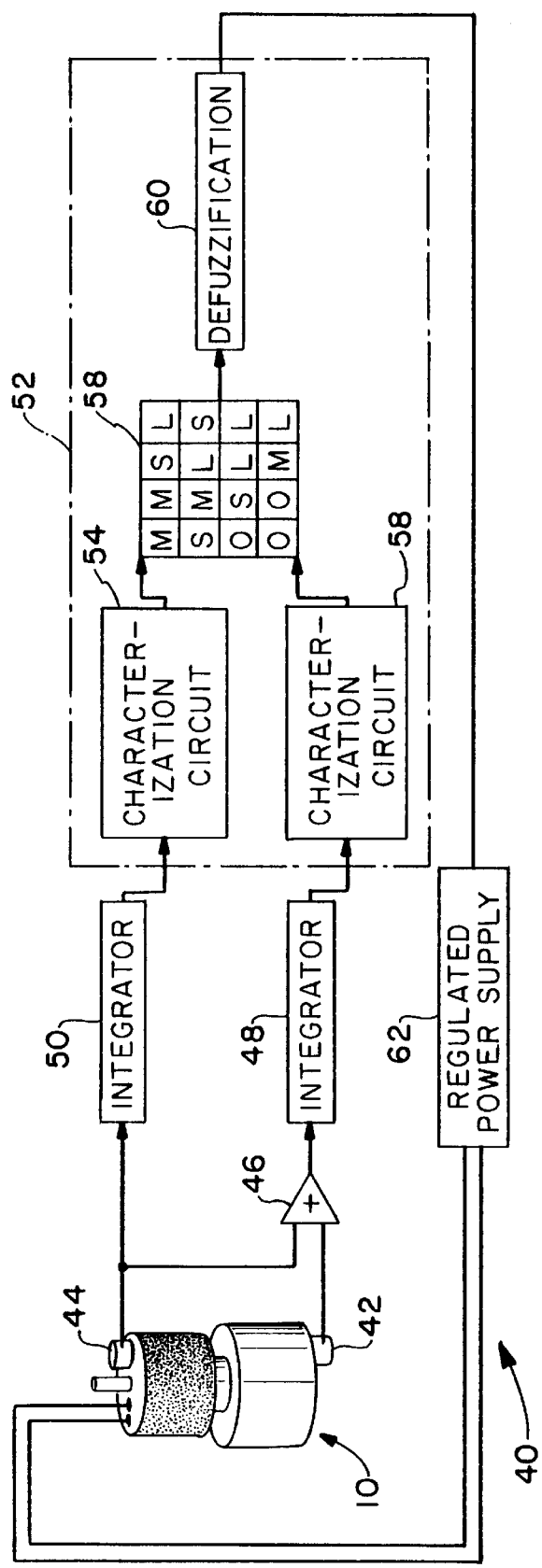
FIG. 2 is a block diagram of a damper control system according to the invention.

Referring now to FIG. 2, it can be seen that an ER fluid damper control system made in accordance with the invention is designated generally by the numeral 40. Here, an accelerometer 42 is associated with the unsprung mass of the vehicle such as the suspension 18, while an accelerometer 44 is associated with the sprung mass, such as the vehicle body 14. Accordingly, the accelerometers 42, 44, emit output signals corresponding to the instantaneous acceleration or movement of the associated portion of the vehicle, and connected portion of the damper 10 respectively. These signals are passed to a differencing circuit 46 which, by determining the difference between the outputs of the accelerometers 42, 44, generates an output signal corresponding to the instantaneous acceleration of the piston of the ER damper 10. This signal is passed to the integrator 48 which produces an output corresponding to the instantaneous piston velocity. In like manner, the output of the accelerometer 44 is passed to the integrator 50 which produces an output corresponding to the instantaneous velocity of the sprung mass. The sprung mass velocity signal from the integrator 50 and the piston velocity signal from the integrator 48 provide the input control signals to the fuzzy inference circuit 52 to be discussed below. Suffice it to say, that it has been found that such instantaneous velocity signals may be characterized and compared to establish a control signal in a feedback loop to control the electric field generated by the electrodes 26, 28. It should also be appreciated that the sprung mass velocity signal and the piston velocity signal may be generated by means other than that just described and shown in FIG. 2. Indeed, the accelerometers 42, 44 could be replaced with displacement gauges or displacement meters presenting an output signal which, when differentiated, would provide the desired velocity signals. In other words, with the accelerometers 42, 44 replaced by appropriate displacement gauges, and with the integrators 48, 50 being replaced with appropriate differentiating circuits, the necessary sprung mass velocity signals and piston velocity signals could be generated.

The instantaneous velocity signals of the sprung mass and piston are applied to the fuzzy inference circuit 52 which typically comprises a dedicated microprocessor. As a portion of the fuzzy inference circuit 52, a characterization circuit 54 is provided to receive the sprung mass velocity signal and a similar characterization circuit 56 is provided to receive the piston velocity signal. The characterization circuits 54, 56 determine the membership function of the velocity input signals prior to for application of a fuzzy rule for generation of the control output signal. In implementation, the fuzzy rule comprises a look-up table 58 maintained as a portion of the microprocessor of the fuzzy inference circuit 52, maintaining the characteristic fuzzy rule of the system. Such would normally be maintained in a ROM. Based upon the employment of fuzzy logic, by applying the fuzzy rule 58 to the membership functions 54, 56, an output signal is generated by the defuzzification circuit 60 as will be appreciated by those skilled in the art. The defuzzification circuit 60, acting in conjunction with the look-up table of the fuzzy rule 58, correlates a specific output with various combinations of inputs from the membership functions 54, 56. In other words, depending upon the velocity of the sprung mass and the velocity of the piston, a specific output will be generated. This output is applied to a regulatable power supply 62 which, in turn, passes a corresponding output voltage to the electrodes 26, 28 of the fluid damper 10. This voltage thus establishes, changes, or modifies the electric field generated in the cylindrical path between the electrodes and, accordingly, instantaneously establishes, modifies, or adjusts the spring characteristics of the fluid damper 10.

Those skilled in the art will readily appreciate that the fuzzy rule 58 can be tailored to a specific vehicle and suspension system. The correlation function of the fuzzy rule which establishes a particular output signal for each possible combination of velocity input signals is established as a function of the operational parameters of the vehicle and its suspension system. Suffice it to say that for each vehicle and associated suspension system, any pair of velocity signals as established by the characterization circuits 54, 56 will result in a specific output signal from the defuzzification circuit 60.

It should also be appreciated by those skilled in the art that the characterization circuits 54, 56 will typically include digital-to-analog (D/A) converters and the defuzzification circuit 60 will typically include an analog-to-digital (A/D) converter as well. In other words, the fuzzy inference circuit 52 will receive analog signals as inputs and provide an analog signal as an output, but will typically perform the fuzzy rule in a digital mode.

Figure 3:
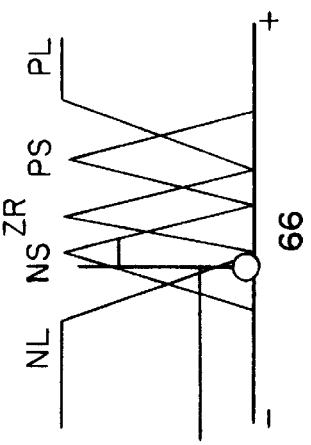
FIG. 3 is an illustration of the membership function for sprung mass velocity.

With reference now to FIG. 3, there is shown the membership function for the sprung mass velocity signal as generated by the integrator 50 and as determined by the characterization or membership function circuit 54. As shown in FIG. 3, the velocity signal may fall within a range extending from a negative value to a positive value and may fall within a range designated "negative large" (NL), "negative small" (NS), "zero" (ZR), "positive small" (PS), and "positive large" (PL). It will also be noted that the ranges of the various characterizations of the sprung mass velocity signal overlap. In the example shown, NL and NS overlap. Similarly, ZR overlaps both NS and PS. Finally, PS overlaps PL. Of course, any of numerous overlapping relationships may exist.

As further shown in FIG. 3, a specific sprung mass velocity signal having an input value 66 is shown as satisfying the criteria for both NL and NS. It is also shown as being more significantly NS than NL. Accordingly, when applying the signal 66 to the fuzzy rule, while the input 66 will be shown as satisfying the membership criteria for both NL and NS, it will be more heavily weighted to NS.

Figure 4:
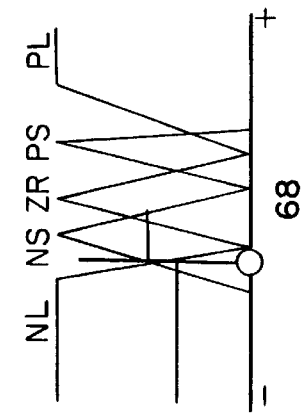
FIG. 4 is an illustration of the membership function for piston velocity.

In FIG. 4, there is shown the membership function for the piston velocity signal from the integrator 48 as determined at the characterization circuit 56. Again, the value of the piston velocity signal extends from a negative large (NL) value to a positive large (PL) value as with the sprung mass velocity signal discussed above with respect to FIG. 3. Similarly, there is an overlap between the various classifications of the signal, with ZR overlapping both NS and PS, and with NL overlapping NS and with PS overlapping PL. Accordingly, input values for the piston velocity signal may satisfy the criteria of any one of several of the listed classifications. By way of example, the piston velocity signal 68 shown in FIG. 4 has a value which satisfies both the negative large (NL) and negative small (NS) criteria. The value of the signal 68 indicates, however, that it should be weighted more for NS membership than for NL membership.

Figure 5:
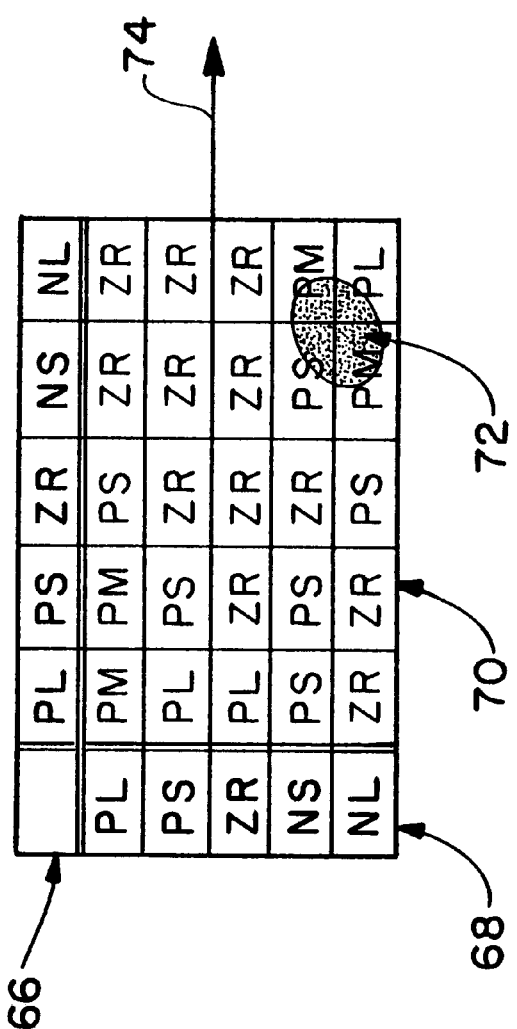
FIG. 5 shows a fuzzy rule table according to the invention.

The weighted input signals 66, 68, as determined from the membership functions illustrated in FIGS. 3 and 4, are applied to the fuzzy rule logic 70 illustrated in FIG. 5. As shown, the fuzzy rule comprises a logic matrix for each of the combinations of NL, NS, ZR, PS and PL for each of the sprung mass velocity signal 66 and the piston velocity signal 68. The actual weighted values of the inputs signals 66, 68, as discussed above, are applied to the matrix of the fuzzy rule 70. In the example shown, the sprung mass velocity signal 66 satisfies both the NS and NL criteria, and more substantially the NS criteria. Similarly, the piston velocity signal 68 satisfies both the NS and NL criteria, and slightly more significantly the NS criteria. Accordingly, the fuzzy inference area 72 is determined by the intersection upon the matrix 70 of the weighted values of the input signals 66, 68, and is designated generally by the numeral 72.

Figure 6:
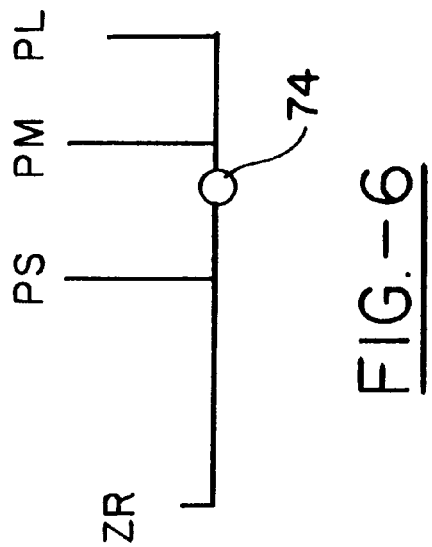
FIG. 6 is an illustration of the membership function of the control output.

The resultant output signal from the application of the fuzzy rule 70 to the input signals 66, 68 is designated by the numeral 74 in FIG. 6. As shown, because of the weighing given the input signals 66, 68, the output value from the fuzzy rule 70 falls between PS and PM, and closer to PM. The output value 74 is then converted in the defuzzification circuit 60 to an intermediate defuzzified value and then transformed by a digital to analog conversion to an analog value for application as a control signal to the power supply 62 to adjust the voltage applied therefrom to the electrodes 26, 28 of the fluid damper 10.

It will be readily appreciated by those skilled in the art that instantaneous adjustment and control of the fluid damper 10 is possible through employment of the system 40. The adjustments are made in real time, and in response to the actual output signals of the sprung and unsprung portions of the system. With the fuzzy rule 70 being tailored to the specific vehicle and suspension system, the instantaneous velocity signals 66, 68 can immediately be employed to adjust or tailor the control voltage applied to the electrodes 26, 28. Accordingly, smooth operation of the vehicle and its suspension system can be attained.

The instant invention provides a high degree of resolution between the input velocity signals and the output control signal. By weighing the input values of the sprung mass and piston velocity signals, a high degree of accuracy and responsiveness may be attained. In other words, the instant invention accommodates the transition of the signal from NL through PL, rather than being uniquely attributed to only one category of the membership function. As a result, the fluid damper 10 may be made highly responsive to actual operating conditions to effectuate a smooth ride in the associated vehicle under virtually all operating conditions.

As a further benefit of the instant invention, the customizing of the system 40 is greatly facilitated. With the membership functions of the characterizing circuits 54, 56 and fuzzy rule 58 maintained in digital memory of the dedicated microprocessor 58, the membership functions and fuzzy rule can be changed during adaptation of the system 40 to a specific vehicle and suspension system. When the adaptation is completed, the final membership functions and fuzzy rule may be transferred to and stored in a read only (ROM) as a look-up table for control, if desired.

Thus it can be seen that the objects of the invention have been satisfied by the structure and technique presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A control apparatus for controlling the damping force of an electro-rheological fluid damper interposed between sprung and unsprung masses in a vehicle, comprising:

detector means for detecting the velocity of the sprung mass and the relative velocity between the sprung and unsprung masses;

fuzzy inference means for receiving the sprung mass velocity and the relative velocity as inputs and for producing fuzzy outputs in accordance with the application of fuzzy function rules and membership functions that define the state of inference of the sprung mass velocity and relative velocity as fuzzy inference input variables, said spring mass velocity signal and said relative velocity signal having weighted values determined by said membership function; and means for defuzzification of the fuzzy outputs to provide a damper control signal for controlling the damping force of the damper.

2. The control apparatus according to claim 1, wherein said detector means comprises a first accelerometer connected to a suspension of the vehicle and a second accelerometer connected to a piston of said electro-rheological fluid damper.

3. The control apparatus according to claim 2, wherein said detector means further comprises a differencing circuit interconnected between said first and second accelerometers.

4. The control apparatus according to claim 3, wherein said detector means further comprises a first integrator connected to said first accelerometer and generating a first original corresponding said sprung mass, and a second integrator connected to said differencing circuit and generating a second signal corresponding to said relative velocity between said sprung and unsprung masses.

5. The control apparatus according to claim 1, wherein said fuzzy interference means further comprises a look-up table maintaining said fuzzy function rules.

6. The control apparatus according to claim 5, further comprising a power supply receiving said fuzzy outputs and correspondingly generating said damper control signal, said power supply being interconnected with electrodes of said damper and applying said control signal thereto.

7. A method for controlling the damping force of an electro-rheological fluid damper interposed between sprung and unsprung masses in a vehicle, comprising the steps of:

detecting the velocity of the sprung mass and the relative velocity between the sprung and unsprung masses;

performing fuzzy inference using the sprung mass velocity and the relative velocity as inputs for producing fuzzy outputs in accordance with the application of fuzzy function rules and membership functions that define the state of inference of the sprung mass velocity and relative velocity as weighted value fuzzy inference input variables; and defuzzifying the fuzzy outputs to provide a damper control signal, and using the damper control signal to control the damping force of the damper.

8. A method as set forth in claim 7, comprising the step of tuning the fluid damper by changing the membership function of at least one of the fuzzy inputs and outputs.

9. A method as set forth in claim 8, comprising the step of tuning the fluid damper by changing the fuzzy function rules.

10. The method as set forth in claim 7 wherein said step of detecting the velocities comprises sensing acceleration signals and integrating such signals.

11. A method as set forth in claim 10, wherein said damper control signal is generated by regulating a voltage supply.

* * * * *